United States Patent
Vah et al.

(10) Patent No.: US 11,099,928 B1
(45) Date of Patent: Aug. 24, 2021

(54) UTILIZING MACHINE LEARNING TO PREDICT SUCCESS OF TROUBLESHOOTING ACTIONS FOR REPAIRING ASSETS

(71) Applicant: EMC IP Holding Company LLC, Hopkinton, MA (US)

(72) Inventors: Jeffrey Scott Vah, Austin, TX (US); Ravi Shukla, Bangalore (IN); Aaron Sanchez, Austin, TX (US); Jim Henry Wiggers, Cedar Park, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 60 days.

(21) Appl. No.: 16/802,028

(22) Filed: Feb. 26, 2020

(51) Int. Cl.
| | |
|---|---|
| *G06F 11/00* | (2006.01) |
| *G06F 11/07* | (2006.01) |
| *G06N 20/00* | (2019.01) |
| *G06F 11/34* | (2006.01) |

(52) U.S. Cl.
CPC ........ *G06F 11/0793* (2013.01); *G06F 11/079* (2013.01); *G06F 11/3466* (2013.01); *G06N 20/00* (2019.01)

(58) Field of Classification Search
CPC ............... G06F 11/079; G06F 11/0793; G06F 11/3466; G06N 20/00
See application file for complete search history.

(56) References Cited

U.S. PATENT DOCUMENTS

| | | | |
|---|---|---|---|
| 6,088,690 A | 7/2000 | Gounares et al. | |
| 9,336,259 B1* | 5/2016 | Kane | G06F 11/3006 |
| 10,445,673 B1* | 10/2019 | Hofmann | G06N 3/08 |
| 10,917,520 B1* | 2/2021 | T. G | H04M 3/5233 |
| 2006/0004680 A1 | 1/2006 | Robarts et al. | |

(Continued)

OTHER PUBLICATIONS

D. Neg, "Seq2Seq: The Clown Car of Deep Learning," https://medium.com/@devnag/seq2seq-the-clown-car-of-deep-learning-f88e1204dac3, Apr. 24, 2019, 7 pages.

(Continued)

*Primary Examiner* — Joshua P Lottich
(74) *Attorney, Agent, or Firm* — Ryan, Mason & Lewis, LLP

(57) ABSTRACT

An apparatus includes at least one processing device configured to obtain information regarding a given asset to be repaired, to generate a recommended troubleshooting action to be performed on the given asset, and to provide the recommended troubleshooting action and the obtained information regarding the given asset as input to an encoder of a machine learning model implementing an attention mechanism. The at least one processing device is also configured to receive, from a decoder of the machine learning model, a predicted success of the recommended troubleshooting action. The at least one processing device is further configured to determine whether the predicted success of the recommended troubleshooting action meets designated criteria, to perform the recommended troubleshooting action responsive to the predicted success meeting the designated criteria, and, to modify the recommended troubleshooting action responsive to the predicted success not meeting the designated criteria.

20 Claims, 13 Drawing Sheets

(56) References Cited

U.S. PATENT DOCUMENTS

| | | | | |
|---|---|---|---|---|
| 2012/0072769 | A1* | 3/2012 | Goldszmidt | G06F 11/3055 |
| | | | | 714/15 |
| 2014/0068330 | A1* | 3/2014 | Hecox | G06F 11/0706 |
| | | | | 714/26 |
| 2017/0212829 | A1 | 7/2017 | Bales et al. | |
| 2017/0286396 | A1 | 10/2017 | Sandor et al. | |
| 2018/0239660 | A1* | 8/2018 | Guha | G06F 11/079 |
| 2018/0285750 | A1* | 10/2018 | Purushothaman | G06N 5/045 |
| 2019/0163594 | A1* | 5/2019 | Hayden | G06F 11/2257 |
| 2019/0227861 | A1* | 7/2019 | Majumder | G06Q 30/016 |
| 2020/0097389 | A1* | 3/2020 | Smith | G06F 11/0775 |
| 2021/0004284 | A1* | 1/2021 | Vah | G06F 11/079 |
| 2021/0042180 | A1* | 2/2021 | Sutton | G06N 5/04 |
| 2021/0096542 | A1* | 4/2021 | Stump | G05B 23/0272 |

OTHER PUBLICATIONS

M. Wadhwa, "Seq2Seq Model in Machine Learning," https://www.geeksforgeeks.org/seq2seq-model-in-machine-learning/, Dec. 5, 2018, 3 pages.

P. Goyal, "What is the Difference Between LSTM, RNN and Sequence to Sequence?," https://www.quora.com/What-is-the-difference-between-LSTM-RNN-and-sequence-to-sequence, Nov. 7, 2017, 2 pages.

M. Ma'Amari, "NLP | Sequence to Sequence Networks| Part 2|Seq2seq Model (EncoderDecoder Model)," https://towardsdatascience.com/nlp-sequence-to-sequence-networks-part-2-seq2seq-model-encoderdecoder-model-6c22e29fd7e1, Nov. 5, 2018, 16 pages.

H. Lamba, "Intuitive Understanding of Attention Mechanism in Deep Learning," https://towardsdatascience.com/intuitive-understanding-of-attention-mechanism-in-deep-learning-6c9482aecf4f, Dec. 3, 2019, 24 pages.

G. Loye, "Attention Mechanism," https://blog.floydhub.com/attention-mechanism/, Sep. 15, 2019, 28 pages.

U.S. Appl. No. 16/522,217 filed in the name of Ravi Shukla et al. filed Jul. 25, 2019, and entitled "Encoding and Decoding Troubleshooting Actions with Machine Learning to Predict Repair Solutions."

* cited by examiner

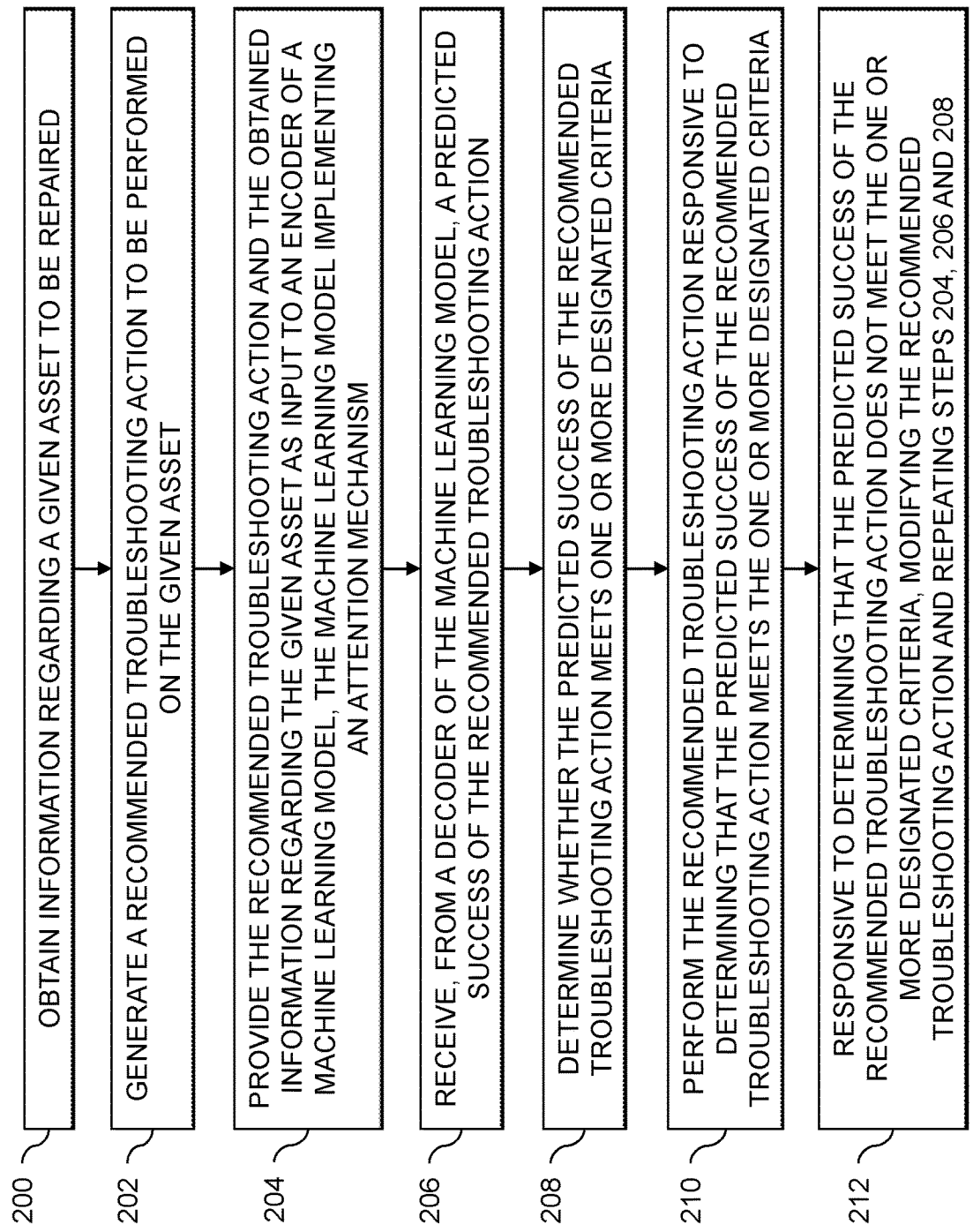

700

| REPAIR IDENTIFIER | PRODUCT DESCRIPTION | SYMPTOM SET | ERROR DESCRIPTION (TIER 1) | ERROR DESCRIPTION (TIER 2) | ERROR CONDITION | ACTION TAKEN | RESULT (TIER 1) | RESULT (TIER 2) | REPAIR KPI (NFF/VFF) | DIAGNOSTIC KPI (EFFECTIVE/ INEFFECTIVE) |
|---|---|---|---|---|---|---|---|---|---|---|
| 388119765 | LATITUDE 7480 | 1 | FREEZE | ON BOOT | ON OS LOAD/ UPON BOOT | ePSA | PASS | PASS | | INEFFECTIVE |
| 388119765 | LATITUDE 7480 | 1 | FREEZE | ON BOOT | ON OS LOAD/ UPON BOOT | REPLACED | COMMODITY | MOTHER- BOARD | NFF | |
| 388119765 | LATITUDE 7480 | 1 | FREEZE | ON BOOT | ON OS LOAD/ UPON BOOT | OS | CLEAN INSTALL | BY PXE/ NETWORK | VFF | |

710

| TRAINING INPUT | TRAINING LABEL ||
| --- | --- | --- |
| | DIAGNOSTIC KPI | REPAIR KPI |
| LATITUDE 7480, FREEZE ON BOOT ON OS LOAD/UPON BOOT, ePSA PASS PASS | INEFFECTIVE | |
| LATITUDE 7480, FREEZE ON BOOT ON OS LOAD/UPON BOOT, REPLACED COMMODITY MOTHERBOARD | | NFF |
| LATITUDE 7480, FREEZE ON BOOT ON OS LOAD/UPON BOOT, OS CLEAN INSTALL BY PXE/NETWORK | | VFF |

FIG. 7

UTILIZING MACHINE LEARNING TO PREDICT SUCCESS OF TROUBLESHOOTING ACTIONS FOR REPAIRING ASSETS

FIELD

The field relates generally to information processing, and more particularly to performing troubleshooting for assets of an information processing system.

BACKGROUND

An enterprise system may include various types of assets, such as desktops, laptops, tablets and other computing devices, which are used by members of the enterprise system. When such assets encounter errors, technicians are responsible for diagnosing and remedying encountered errors through a series of troubleshooting actions. As the number and type of assets in an enterprise system grows, it is increasingly difficult for technicians to efficiently resolve such errors.

SUMMARY

Illustrative embodiments of the present disclosure provide techniques for utilizing machine learning to predict success of troubleshooting actions for repairing assets. Embodiments advantageously allow for more efficient troubleshooting and repair of assets.

In one embodiment, an apparatus comprises at least one processing device comprising a processor coupled to a memory. The at least one processing device is configured to perform steps of obtaining information regarding a given asset to be repaired, generating a recommended troubleshooting action to be performed on the given asset, and providing the recommended troubleshooting action and the obtained information regarding the given asset as input to an encoder of a machine learning model, the machine learning model implementing an attention mechanism. The at least one processing device is also configured to perform the step of receiving, from a decoder of the machine learning model, a predicted success of the recommended troubleshooting action. The at least one processing device is further configured to perform the steps of determining whether the predicted success of the recommended troubleshooting action meets one or more designated criteria, performing the recommended troubleshooting action responsive to determining that the predicted success of the recommended troubleshooting action meets the one or more designated criteria, and, responsive to determining that the predicted success of the recommended troubleshooting action does not meet the one or more designated criteria, modifying the recommended troubleshooting action and repeating the providing, receiving and determining steps.

These and other illustrative embodiments include, without limitation, methods, apparatus, networks, systems and processor-readable storage media.

BRIEF DESCRIPTION OF THE DRAWINGS

FIG. 2 is a flow diagram of an exemplary process for utilizing machine learning to predict success of troubleshooting actions for repairing assets in an illustrative embodiment.

FIG. 7 depicts conversion of repair logs to training input for a machine learning model in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
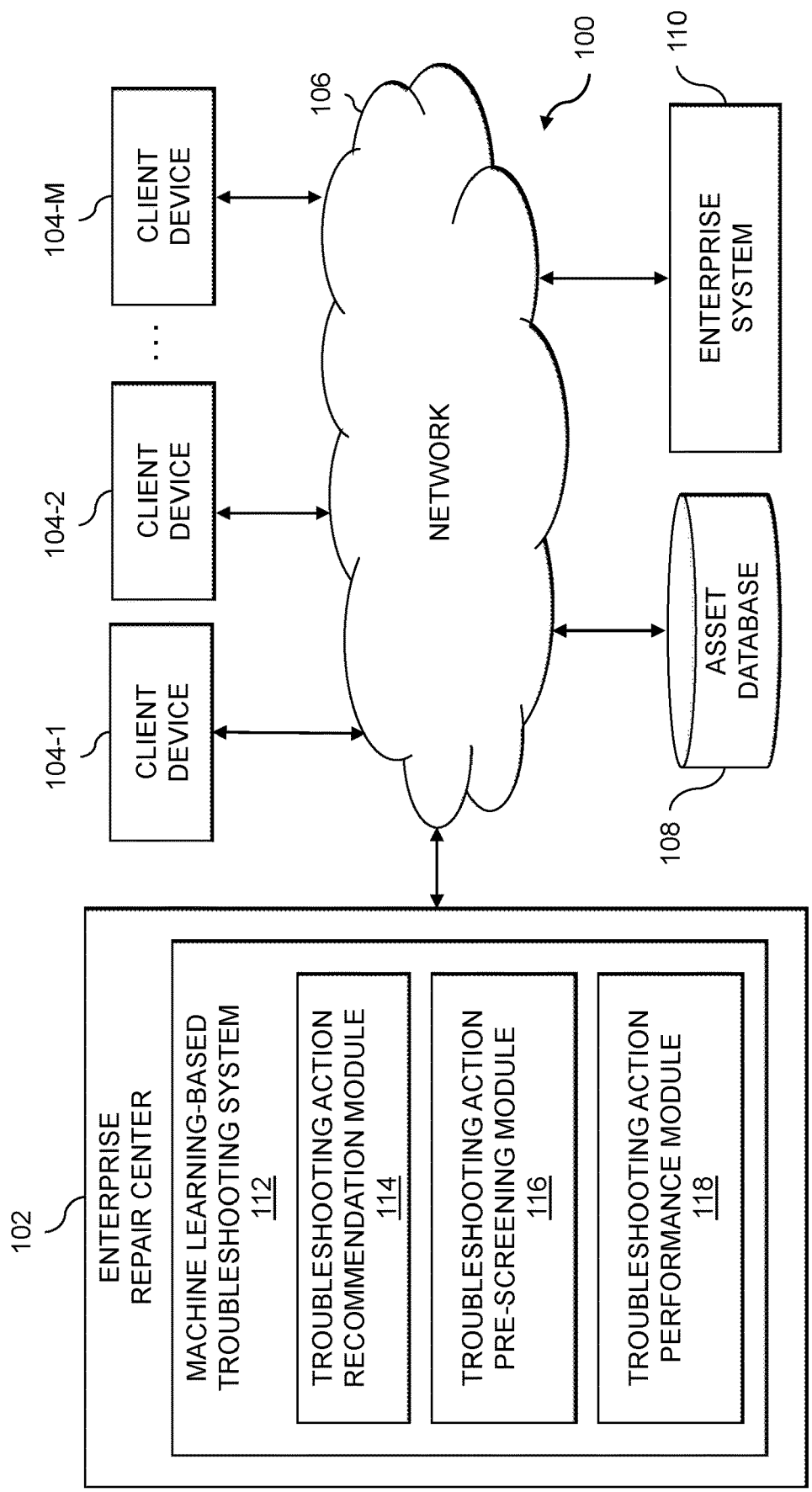
FIG. 1 is a block diagram of an information processing system for utilizing machine learning to predict success of troubleshooting actions for repairing assets in an illustrative embodiment.
Figure 3A:
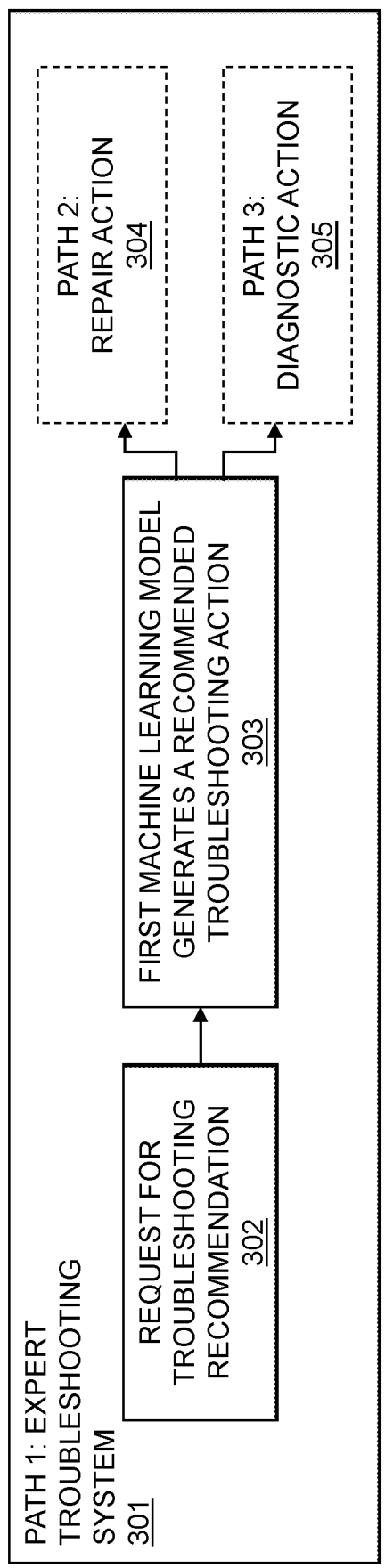
FIGS. 3A-3D depict a system flow for pre-screening recommended troubleshooting actions in an illustrative embodiment.
Figure 3B:
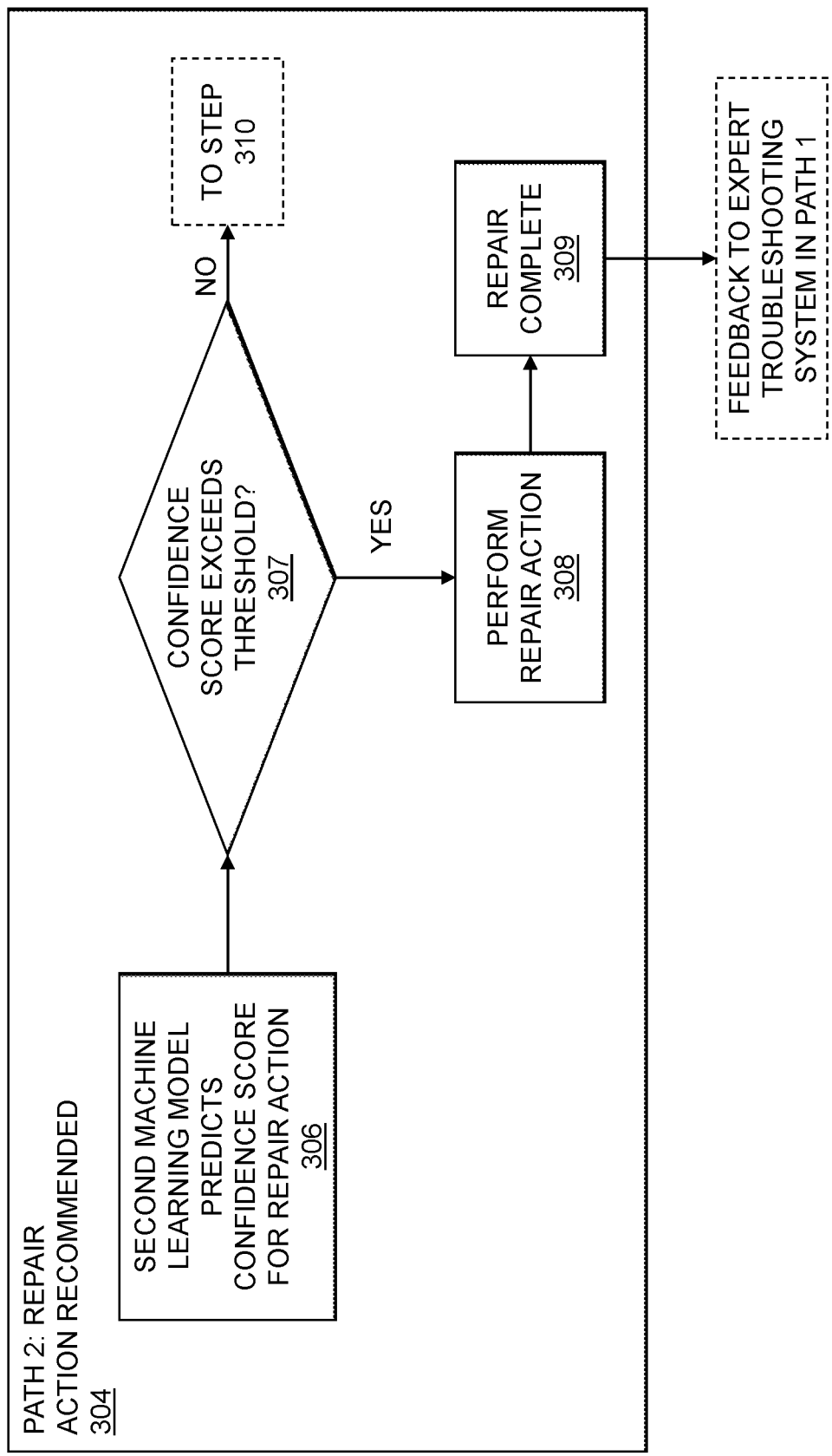
Figure 3C:
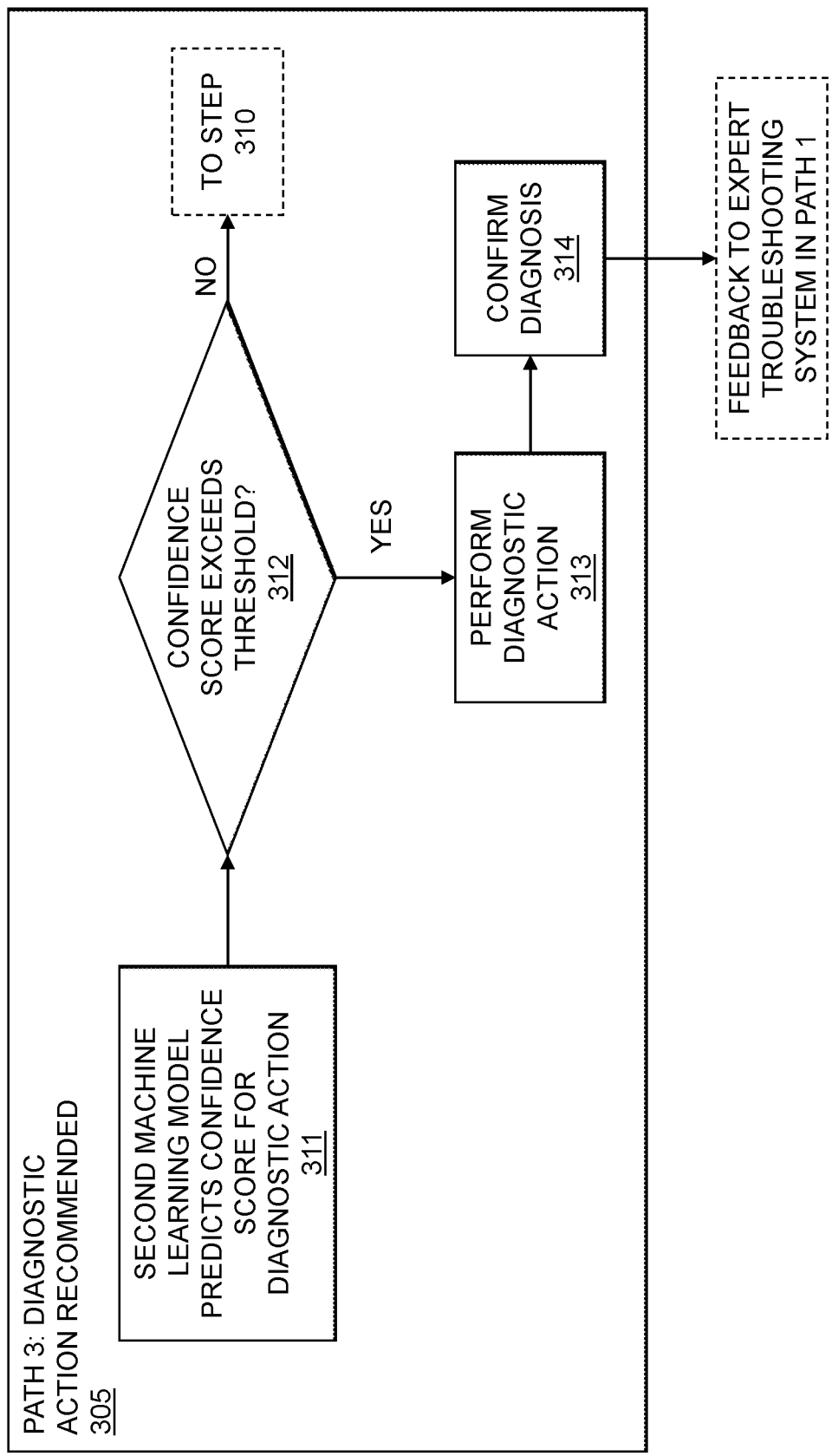
Figure 3D:
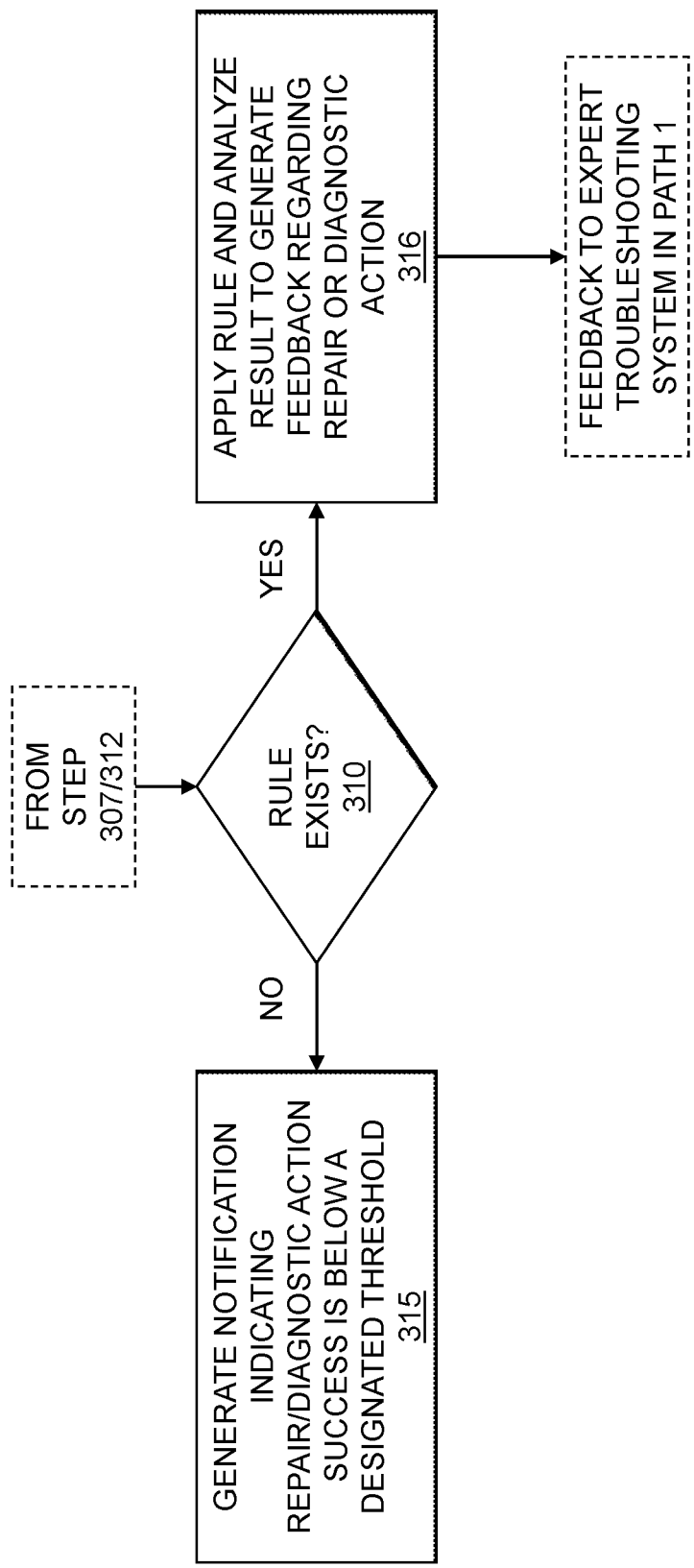

FIG. 1 shows an information processing system 100 configured in accordance with an illustrative embodiment. The information processing system 100 is assumed to be built on at least one processing platform and provides functionality for utilizing machine learning to predict success of troubleshooting actions for repairing assets. The assets may include, by way of example, physical and virtual computing resources in an enterprise system 110. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc. In this embodiment, the system 100 more particularly comprises an enterprise repair center 102 and a plurality of client devices 104-1, 104-2, . . . 104-M (collectively, client devices 104). The client devices 104 are coupled to a network 106. Also coupled to the network 106 is an asset database 108, which may store various information relating to assets in the enterprise system 110 as will be described in further detail below.

As used herein, the term "enterprise system" is intended to be construed broadly to include any information technology (IT) infrastructure having one or more assets. An enterprise system such as enterprise system 110 may include one or more computing devices, one or more data centers, cloud infrastructure comprising one or more clouds, etc. A given enterprise system, such as cloud infrastructure, may host assets that are associated with multiple enterprises (e.g., two or more different business, organizations or other entities).

The client devices 104 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 104 may also or alternately comprise virtualized computing resources, such as VMs, containers, etc.

The client devices 104 in some embodiments comprise respective computers associated with a particular company, organization or other enterprise. Thus, the client devices 104 may be considered examples of assets of the enterprise system 110. In addition, at least portions of the system 100 may also be referred to herein as collectively comprising one or more "enterprises." Numerous other operating scenarios involving a wide variety of different types and arrangements of processing nodes are possible, as will be appreciated by those skilled in the art.

The network 106 is assumed to comprise a global computer network such as the Internet, although other types of networks can be part of the network 106, including a wide area network (WAN), a local area network (LAN), a satellite network, a telephone or cable network, a cellular network, a wireless network such as a WiFi or WiMAX network, or various portions or combinations of these and other types of networks.

The asset database 108, as discussed above, is configured to store and record information relating to assets in or associated with the enterprise system 110. Such assets, as noted above, may include the client devices 104 themselves. The information relating to the assets of the enterprise system 110 may include information such as past errors encountered on the assets and troubleshooting actions used to resolve such encountered errors. Each error or problem, as described in further detail below, may include symptom sets as well as a set of diagnostic, repair and other troubleshooting actions taken in attempt to resolve the encountered symptom sets. The asset database 108 may also store a set of rules or policies for evaluating recommended troubleshooting actions whose predicted success does not meet one or more designated criteria as will be described in further detail below.

The asset database 108 in some embodiments is implemented using one or more storage systems or devices associated with the event platform 102. In some embodiments, one or more of the storage systems utilized to implement the asset database 108 comprises a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the enterprise repair center 102, as well as to support communication between the enterprise repair center 102 and other related systems and devices not explicitly shown.

The client devices 104 are configured to access or otherwise utilize an enterprise system 110. The enterprise system 110 may represent at least a portion of an IT infrastructure comprising a plurality of assets (e.g., physical or virtual computing resources) of a business, organization, enterprise or other entity.

In some embodiments, the client devices 104 are assumed to be associated with repair technicians, system administrators, IT managers or other authorized personnel configured to access and utilize a machine learning-based troubleshooting system 112 of the enterprise repair center 102 to troubleshoot errors encountered by assets of the enterprise system 110. For example, a given one of the client devices 104 may be operated by a mobile technician that travels to a physical location of an asset to be repaired in the enterprise system 110 (e.g., an office, a data center, etc. of the enterprise system 110). The given client device 104 may be used by the repair technician to access a graphical user interface (GUI) provided by the machine learning-based troubleshooting system 112 to input symptom sets and other information regarding the asset to be repaired, and to receive recommendations for troubleshooting actions to be performed on the asset to be repaired. It should be noted that "repair" should be construed broadly, and includes various types of actions taken to remedy a particular error or other symptoms encountered on an asset. The repair may include changing settings of the assets, modifying (e.g., removing, installing, upgrading, etc.) software on the asset, modifying (e.g., removing, installing, replacing, etc.) hardware on the asset, etc.

The machine learning-based troubleshooting system 112 may be provided as a cloud service accessible by the given client device 104 to allow the technician to perform troubleshooting on-site. Alternatively, assets of the enterprise system 110 to be repaired may be provided to a repair depot or other physical site, where technicians utilizing the client devices 104 can perform troubleshooting of the assets using the machine learning-based troubleshooting system 112 of the enterprise repair center 102. The term "enterprise system" as used here is intended to be broadly construed to include assets that are owned by one or more multiple different entities that are troubleshooted by an enterprise. In some embodiments, the assets are owned or operated by the same enterprise that performs the troubleshooting (e.g., where an enterprise such as a business performs troubleshooting for the assets it operates). In other embodiments, the assets may be owned or operated by one or more enterprises different than the enterprise performing the troubleshooting (e.g., a first enterprise performs troubleshooting for assets that are owned by multiple different customers, business, etc.). Various other examples are possible.

In some embodiments, the client devices 104 may implement host agents that are configured for automated transmission of information regarding assets to be repaired to the machine learning-based troubleshooting system 112, and to automatically receive recommendations for troubleshooting actions to be performed on the assets to be repaired. In some cases, the troubleshooting actions to be performed may be fully automated, such as by initiating certain diagnostic tests, software component modifications, etc. In other cases, the troubleshooting actions to be performed may require manual input, such as in replacing hardware components of an asset to be repaired. It should be noted, however, that even actions such as replacing the hardware components may be automated through the use of robotics at the enterprise repair center 102 if desired.

It should be noted that a "host agent" as this term is generally used herein may comprise an automated entity, such as a software entity running on a processing device. Accordingly, a host agent need not be a human entity.

As shown in FIG. 1, the enterprise repair center 102 comprises the machine learning-based troubleshooting system 112. As will be described in further detail below, the machine learning-based troubleshooting system 112 is configured to utilize machine learning to pre-screen troubleshooting actions for repairing assets in the enterprise system 110.

Although shown as an element of the enterprise repair center 102 in this embodiment, the machine learning-based troubleshooting system 112 in other embodiments can be implemented at least in part externally to the enterprise repair center 102, for example, as a stand-alone server, set of servers or other type of system coupled to the network 106. In some embodiments, the machine learning-based troubleshooting system 112 may be implemented at least in part within one or more of the client devices 104.

The machine learning-based troubleshooting system 112 in the FIG. 1 embodiment is assumed to be implemented using at least one processing device. Each such processing device generally comprises at least one processor and an associated memory, and implements one or more functional modules for controlling certain features of machine learning-based troubleshooting system 112. In the FIG. 1 embodiment, the machine learning-based troubleshooting system 112 comprises a troubleshooting action recommendation module 114, a troubleshooting action pre-screening module 116, and a troubleshooting action performance module 118.

The machine learning-based troubleshooting system 112 is configured to obtain information regarding a given asset to be repaired. Using this information, the troubleshooting action recommendation module 114 generates a recommended troubleshooting action to be performed on the given asset. To do so, the troubleshooting action recommendation module 114 may utilize a first machine learning model (e.g., a sequence-to-sequence model where the information regarding the given asset to be repaired is passed as input to an encoder of the sequence-to-sequence model, and the recommended troubleshooting action is received as output from a decoder of the sequence-to-sequence model).

The troubleshooting action pre-screening module 116 is configured to utilize a second machine learning model to predict the success of the recommended troubleshooting action generated by the troubleshooting action recommendation module 114. To do so, the troubleshooting action pre-screening module 116 provides the recommended troubleshooting action and the obtained information from the output of the troubleshooting action recommendation module 114 regarding the given asset as input to an encoder of the second machine learning model, and receives from a decoder of the second machine learning model a predicted success of the recommended troubleshooting action. The second machine learning model, similar to the first machine learning model, may comprise a sequence-to-sequence model. The second machine learning model, however, implements an attention mechanism that causes the decoder to focus on particular portions of the input to the encoder.

The troubleshooting action pre-screening module 116 is further configured to determine whether the predicted success of the recommended troubleshooting action meets one or more designated criteria. The troubleshooting action performance module 118 allows the recommended troubleshooting action responsive to determining that the predicted success of the recommended troubleshooting action meets the one or more designated criteria. Responsive to determining that the predicted success of the recommended troubleshooting action does not meet the one or more designated criteria, the troubleshooting action recommendation module 114 modifies the recommended troubleshooting action. The troubleshooting action pre-screening module 116 then analyzes the modified recommended troubleshooting action.

The machine learning-based troubleshooting system 112 may utilize the modules 114, 116 and 118 in an iterative process until the given asset is successfully repaired or a designated stop condition is reached (e.g., a threshold number of iterations of requesting recommended troubleshooting actions).

It is to be appreciated that the particular arrangement of the enterprise repair center 102, machine learning-based troubleshooting system 112, the troubleshooting action recommendation module 114, the troubleshooting action pre-screening module 116, and the troubleshooting action performance module 118 illustrated in the FIG. 1 embodiment is presented by way of example only, and alternative arrangements can be used in other embodiments. As discussed above, for example, the enterprise repair center 102, the machine learning-based troubleshooting system 112, the troubleshooting action recommendation module 114, the troubleshooting action pre-screening module 116, and the troubleshooting action performance module 118 may in some embodiments be implemented internal to one or more of the client devices 104. As another example, the functionality associated with the troubleshooting action recommendation module 114, the troubleshooting action pre-screening module 116, and the troubleshooting action performance module 118 may be combined into one module, or separated across more than three modules with the multiple modules possibly being implemented with multiple distinct processors or processing devices.

At least portions of the troubleshooting action recommendation module 114, the troubleshooting action pre-screening module 116, and the troubleshooting action performance module 118 may be implemented at least in part in the form of software that is stored in memory and executed by a processor.

It is to be understood that the particular set of elements shown in FIG. 1 for utilizing machine learning to predict success of troubleshooting actions for repairing assets in the enterprise system 110 is presented by way of illustrative example only, and in other embodiments additional or alternative elements may be used. Thus, another embodiment may include additional or alternative systems, devices and other network entities, as well as different arrangements of modules and other components.

By way of example, in other embodiments, the machine learning-based troubleshooting system 112 may be implemented external to enterprise repair center 102, such that the enterprise repair center 102 can be eliminated.

The machine learning-based troubleshooting system 112 and other portions of the system 100, as will be described in further detail below, may be part of cloud infrastructure.

The machine learning-based troubleshooting system 112 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 104 and machine learning-based troubleshooting system 112 or components thereof (e.g., the troubleshooting action recommendation module 114, the troubleshooting action pre-screening module 116, and the troubleshooting action performance module 118) may be implemented on respective distinct processing platforms, although numerous other arrangements are possible. For example, in some embodiments at least portions of the machine learning-based troubleshooting system 112 and one or more of the client devices 104 are implemented on the same processing platform. A given client device (e.g., 104-1) can therefore be implemented at least in part within at least one processing platform that implements at least a portion of the machine learning-based troubleshooting system 112.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the client devices 104, machine learning-based troubleshooting system 112 or portions or components thereof, to reside in different data centers. Numerous other distributed implementations are possible. The machine learning-based troubleshooting system 112 can also be implemented in a distributed manner across multiple data centers.

Additional examples of processing platforms utilized to implement the machine learning-based troubleshooting system 112 in illustrative embodiments will be described in more detail below in conjunction with FIGS. 9 and 10.

It is to be appreciated that these and other features of illustrative embodiments are presented by way of example only, and should not be construed as limiting in any way.

An exemplary process for utilizing machine learning to predict success of troubleshooting actions for repairing assets will now be described in more detail with reference to the flow diagram of FIG. 2. It is to be understood that this particular process is only an example, and that additional or alternative processes for utilizing machine learning to predict success of troubleshooting actions for repairing assets may be used in other embodiments.

In this embodiment, the process includes steps 200 through 212. These steps are assumed to be performed by the machine learning-based troubleshooting system 112 utilizing the troubleshooting action recommendation module 114, the troubleshooting action pre-screening module 116, and the troubleshooting action performance module 118. The process begins with step 200, obtaining information regarding a given asset to be repaired. The information regarding the given asset to be repaired may comprise one or more symptom sets, a given one of the one or more symptom sets comprising an identifier of the given asset, a description of the given asset, and a description of at least one error encountered on the given asset. The information regarding the given asset to be repaired may further comprise result information regarding the success or failure of one or more troubleshooting actions previously performed on the given asset.

In step 202, a recommended troubleshooting action to be performed on the given asset is generated. The recommended troubleshooting action and the obtained information regarding the given asset are provided as input to an encoder of a machine learning model in step 204. In step 206, a predicted success of the recommended troubleshooting action is received from a decoder of the machine learning model. The machine learning model utilized in steps 204 and 206 is assumed to implement an attention mechanism that is configured to focus the decoder on one or more portions of the input to the encoder. The machine learning model utilized in steps 204 and 206 may comprise a sequence-to-sequence machine learning model that utilizes a recurrent neural network (RNN) architecture such as a long short-term memory (LSTM) model architecture.

The FIG. 2 process continues with step 208, determining whether the predicted success of the recommended troubleshooting action meets one or more designated criteria. Step 208 may include determining whether the predicted success of the recommended troubleshooting action meets a confidence score for each of one or more key performance indicators (KPIs). Where the recommended troubleshooting action comprises a diagnostic action, the one or more KPIs may comprise at least one of an effectiveness in diagnosing one or more errors encountered by the given asset, a complexity of performing the diagnostic action, and a cost of performing the diagnostic action. Where the recommended troubleshooting action comprises a repair action, the one or more KPIs may comprise at least one of a likelihood of the repair action resulting in a verified fault of one or more components of the given asset, a complexity of performing the repair action, and a cost of performing the repair action.

Determining whether the predicted success of the recommended troubleshooting action meets the one or more designated criteria in step 208 may further comprise, responsive to determining that the predicted success of the recommended troubleshooting action does not meet the confidence score for each of one or more KPIs, determining whether the recommended troubleshooting action is associated with at least one policy from a policy database. Responsive to determining that the recommended troubleshooting action is not associated with at least one policy from the policy database, a notification may be provided to a technician responsible for repairing the given asset. The notification indicates the predicted success of the recommended troubleshooting action (e.g., the notification may comprise a warning indicating that the recommended troubleshooting action is not likely to be successful). Responsive to determining that the recommended troubleshooting action is associated with at least one policy from the policy database, at least one policy is applied to determine whether to perform the recommended troubleshooting action (e.g., proceed to step 210) or modify the recommended troubleshooting action (e.g., proceed to step 212). The policy database is assumed to comprise various policies covering certain situations (e.g., types of recommended troubleshooting actions, combinations of recommended troubleshooting actions and types of assets, etc.). For example, a policy may specify that recommended troubleshooting actions considered inexpensive (e.g., in terms of time and cost to implement according to associated thresholds) are to be performed even if the predicted success does not meet the confidence score for associated KPIs. As another example, a policy may specify that certain types of troubleshooting actions should or should not be performed for particular types of assets (e.g., for assets with known faults, certain diagnostic actions may be skipped in favor of others).

In step 210, the recommended troubleshooting action is performed responsive to determining that the predicted success of the recommended troubleshooting action meets the one or more designated criteria. The given asset may comprise a computing device, and the recommended troubleshooting action may comprise a diagnostic or a repair action. The diagnostic action may comprise running tests on software components of the computing device, or inspecting hardware components of the computing device. The repair action may comprise modifying one or more software or hardware components of the computing device. Responsive to determining that the predicted success of the recommended troubleshooting action does not meet the one or more designated criteria, the recommended troubleshooting action is modified in step 212. Steps 204, 206 and 208 are then repeated utilizing the modified recommended troubleshooting action.

In some embodiments, multiple machine learning models are utilized. For example, a "first" machine learning model may be used to obtain a recommended troubleshooting action, with steps 204 and 206 utilizing a "second" machine learning model. Thus, in some embodiments, step 202 utilizes the first machine learning model (e.g., different than the second machine learning model utilized in steps 204 and 206), where the obtained information regarding the given asset is provided as input to an encoder of the first machine learning model and the recommended troubleshooting action is received from a decoder of the first machine learning model. Modifying the recommended troubleshooting action in step 212 may comprise providing the obtained information regarding the given asset and feedback regarding the recommended troubleshooting action as input to the first machine learning model and receiving, from the decoder of the first machine learning model, the modified recommended troubleshooting action.

Techniques for utilizing machine learning for troubleshooting assets are described in U.S. patent application Ser. No. 16/522,217, entitled "Encoding and Decoding Troubleshooting Actions with Machine Learning to Predict Repair Solutions," the disclosure of which is incorporated by reference herein in its entirety. Such techniques utilize machine learning to predict troubleshooting actions (e.g., diagnostic actions, repair actions, etc.) for a particular asset (e.g., a computing device such as a laptop), where the machine learning model bases predictions on correct repair decisions (e.g., where a part of the laptop or other computing device is replaced by a technician and later found to be defective in screening, or categorized as verified fault found (VFF)). In this manner, the machine learning model learns from correct repair decisions but not incorrect repair decisions (e.g., where a "good" part of the laptop or other computing device is needlessly replaced and categorized as no fault found (NFF)). Illustrative embodiments incorporate such feedback (e.g., from both correct and incorrect repair and diagnostic decisions) to improve a system for troubleshooting computing devices or other types of assets.

Troubleshooting re-work may be a result of waste (e.g., from replacing good parts unnecessarily), incorrect troubleshooting, etc. Such troubleshooting re-work can be a significant cost to an enterprise, in terms of time consumed, money spent, etc. Troubleshooting re-work costs may be measured through various key performance indicators (KPIs), in terms of labor inefficiencies, parts waste, inappropriate use of diagnostics, customer returns within some designated threshold time of repair (e.g., 28 days) also referred to as repeat dispatch rate (RDR), etc. Illustrative embodiments link troubleshooting action predictions from a machine learning model with various KPIs (e.g., percentage of screened parts resulting in VFF/NFF, percentage of most effective diagnostics, percentage of assets returned to a repair center within a designated time period such as 28 days, etc.). In this way, troubleshooting action recommendations may be optimized or improved to reduce the amount of troubleshooting re-work.

The techniques described herein, in some embodiments, may be used to complement systems such as that described in the above-referenced U.S. patent application Ser. No. 16/522,217. It should be appreciated, however, that embodiments are not limited to use in extending the systems described in U.S. patent application Ser. No. 16/522,217. Embodiments may more generally be used to extend or complement a troubleshooting recommendation system with a machine learning model that factors both correct and incorrect troubleshooting decisions into troubleshooting recommendations produced by the troubleshooting recommendation system. In various embodiments described below, it is assumed that the troubleshooting recommendation system utilizes a first machine learning model to generate troubleshooting action recommendations, and that the troubleshooting recommendation system is extended with a second machine learning model that factors in both correct and incorrect troubleshooting decisions into the troubleshooting action recommendations from the first machine learning model. Advantageously, the second machine learning model may be configured to consider various rules or policies, and to present warnings or other notifications to technicians performing troubleshooting as desired. In some embodiments, as will be described in further detail below, the second machine learning model utilizes a RNN architecture such as a LSTM-based sequence-to-sequence model with an attention mechanism.

The first machine learning model may predict troubleshooting actions using a sequence-to-sequence model that treats the troubleshooting process as a conversation, and thus may be referred to as a conversational machine learning model herein. Such a conversational machine learning model is configured to preserve the context of all the steps involved in a troubleshooting scenario, and suggests the next steps (e.g., diagnostic actions, repair actions) like a human technician would. One of the biggest challenges for enterprise repair centers, however, is the cost incurred from wastage (e.g., of "good" parts that are replaced by technicians). The information about replaced parts (e.g., whether the replaced parts were good/NFF or bad/VFF) is available but not necessarily utilized by the conversational machine learning model in predicting troubleshooting actions.

In some embodiments, the second machine learning model factors in KPIs (e.g., whether replaced parts are good/NFF or bad/VFF, whether diagnostic actions are effective or ineffective, etc.) into a sequence-to-sequence based model to avoid the prediction of undesirable troubleshooting actions (e.g., repair solutions resulting in replaced parts that are good/NFF, diagnostics solutions that are ineffective, etc.). The first machine learning model is thus complemented with the second machine learning model, which may comprise a sequence-to-sequence model with an attention mechanism. Advantageously, the second machine learning model overcomes the limitations of the first machine learning model by considering all troubleshooting outcomes before making a troubleshooting action recommendation.

The inclusion of the second machine learning model provides a pre-screening of the troubleshooting action recommendation before the troubleshooting action recommendation is provided to a technician. The pre-screening process may result in two decisions: (1) whether or not the recommended troubleshooting action provided by the first machine learning model satisfies some designated threshold prediction of success (e.g., determined based at least in part utilizing a confidence score for the recommended troubleshooting action); and (2) whether or not the recommended troubleshooting action provided by the first machine learning model satisfies desirable outcomes based at least in part on KPIs (e.g., VFF/NFF, cumbersome/lean, complex/trivial, repair yield, RDR, etc.).

If the pre-screening outcome meets both of these conditions, the recommended troubleshooting action is unchanged and is presented to the technician. If the pre-screening outcome does not meet one or both of these conditions, the recommended troubleshooting action may be altered or supplemented based on one or more rules or policies (e.g., the recommended troubleshooting action may be overridden with an alternate recommendation based on the rules or policies, the recommended troubleshooting action may be accepted based on the rules or policies, etc.). The rules or policies may be based on historical feedback data for previous troubleshooting processes for similar assets, based on expert knowledge, etc. If no rules or policies are present for handling a particular recommended troubleshooting action, the recommended troubleshooting action may be presented to the technician along with a notification (e.g., a warning) that an undesirable outcome is likely to result from implementing the recommended troubleshooting action.

FIGS. 3A-3D illustrate a workflow for pre-screening troubleshooting action recommendations using an ensemble machine learning model approach. The workflow begins with a user (e.g., a technician) invoking an expert troubleshooting system 301 in path 1. The user in step 302 requests a troubleshooting recommendation for a particular asset (e.g., a computing device such as a laptop). A first machine learning model in step 303 generates a recommended troubleshooting action. The first machine learning model, in some embodiments, is a conversational machine learning model that treats the steps of a troubleshooting process as a conversation. In other embodiments, however, various other types of machine learning models may be utilized to generate the recommended troubleshooting action. From here, the workflow branches into path 2 in step 304 if the recommended troubleshooting action is a repair action or into path 3 in step 305 if the recommended troubleshooting action is a diagnostic action.

When the recommended troubleshooting action is a repair action and the system flow proceeds to path 2 in step 304, the second machine learning model is utilized to predict a confidence score for the recommended repair action in step 306. In step 307, a determination is made as to whether the confidence score for the recommended repair action exceeds a designated threshold confidence score. The threshold confidence score may be set as desired by a user to optimize pre-screening for reducing repair action re-work. In some embodiments, the step 307 determination is a prediction for one or more KPIs associated with the recommended repair action. For example, step 307 may be viewed as determining whether the recommended repair action is likely to result in VFF (e.g., proceed to step 308) or NFF (e.g., proceed to step 310).

If the confidence score exceeds the designated threshold in step 307, the system flow proceeds to step 308 where the recommended repair action is performed. The recommended repair action, in some cases, is automatically performed on the given asset. In other cases, the recommended repair action is performed by generating an instruction to a user to apply the recommended repair action to the given asset. It should be noted that the user that performs the recommended repair action may, but is not required to, be the same as the user that requested the troubleshooting action recommendation in step 302. In step 309, the repair is completed and the given asset is analyzed (e.g., to determine whether the recommended repair action was successful). Such results are provided as feedback to the troubleshooting system in path 1 (e.g., the results are provided as feedback or additional training data for the first machine learning model utilized in step 303). If the confidence score does not exceed the designated threshold in step 307, the system flow proceeds to step 310, which will be described in further detail below.

When the recommended troubleshooting action is a diagnostic action and the system flow proceeds to path 3 in step 305, the second machine learning model is utilized to predict a confidence score for the recommended diagnostic action in step 311. In step 312, a determination is made as to whether the confidence score for the recommended diagnostic action exceeds a designated threshold confidence score. The threshold confidence score may be set as desired by a user to optimize pre-screening for reducing repair action re-work. In some embodiments, the step 312 determination is a prediction for one or more KPIs associated with the recommended diagnostic action. For example, step 312 may be viewed as determining whether the recommended diagnostic action is likely to be effective (e.g., proceed to step 313) or ineffective (e.g., proceed to step 310).

It should be appreciated that the threshold confidence score utilized in step 312 may be different than the threshold confidence score utilized in step 307. These threshold levels are based on confidence scores from respective machine learning models. For example, it may be less costly to perform diagnostic actions (e.g., running tests) on the given asset than to perform repair actions (e.g., replacing parts) on the given asset. Therefore, in some embodiments the threshold confidence score for step 312 is set lower than the threshold confidence score for step 307. In other embodiments, however, it may be desired to use the same threshold confidence score in both steps 307 and 312, or to use a higher threshold confidence score in step 312 than in step 307 (e.g., where it is desired to reduce the total time required for completing the troubleshooting process, as repair actions such as replacing parts may take less time than running lengthy diagnostic tests).

If the confidence score exceeds the designated threshold in step 312, the system flow proceeds to step 313 where the recommended diagnostic action is performed. The recommended diagnostic action, in some cases, is automatically performed on the given asset. In other cases, the recommended diagnostic action is performed by generating an instruction to a user to apply the recommended diagnostic action on the given asset. It should be noted that the user that performs the recommended diagnostic action may, but is not required to, be the same as the user that requested the troubleshooting action recommendation in step 302. In step 314, the diagnosis for the given asset is confirmed (e.g., the diagnostic results are analyzed to determine if the problem with the given asset has been successfully diagnosed). Such results are provided as feedback to the troubleshooting system in path 1 (e.g., the results are provided as feedback or additional training data for the first machine learning model utilized in step 303). If the confidence score does not exceed the designated threshold in step 312, the system flow proceeds to step 310.

In step 310, a determination is made as to whether any rule or policy exists for the recommended repair or diagnostic action. Various types of rules or policies may be used. For example, a rule or policy may be based on characteristics of the given asset that is being troubleshooted. Such characteristics may include a type of the given asset (e.g., a product platform of the given asset), a priority of the given asset, an age of the given asset or components thereof, whether the given asset has been to the enterprise repair center recently (e.g., whether the given asset is categorized as repeat repair), etc. Such characteristics may affect whether certain types of diagnostic or repair actions should or should not be performed. As an example, if a storage device of a given asset is old (e.g., as defined by some threshold age), it may be determined that it is more cost-effective to replace the storage device rather than run lengthy diagnostic tests to confirm failure of the storage device. As another example, if a repair action recommends replacing a comparatively expensive part of a computing device such as the motherboard and the motherboard is new (e.g., as defined by some threshold age), it may be determined that it is more cost-effective to run additional diagnostics than to replace the motherboard. Various other examples are possible.

If no rule or policy exists in step 310, a notification is generated in step 315 indicating that the recommended repair or diagnostic action is likely to result in an undesirable outcome (e.g., that the predicted success of the recommended repair or diagnostic action is below a designated threshold). This notification may be provided to the user that requested the recommended troubleshooting action in step 302. The notification may also or alternatively be provided to various other users. For example, the user requesting the recommended troubleshooting action in step 302 may be a technician, and the notification may be sent to the technician as well as to a supervisor of that technician, or to quality control staff of a repair center responsible for analyzing the efficiency of troubleshooting actions. The technician, supervisor or quality control staff, in some embodiments, utilizes the notification to create new rules or policies, or modify existing rules or policies, for future recommended troubleshooting actions (e.g., to create a new rule or policy, or modify an existing rule or policy, when the recommended troubleshooting action ultimately ends up being successful).

If a rule or policy exists in step 310, that rule or policy is applied and feedback is generated regarding the recommended repair or diagnostic action in step 316. Such feedback is provided to the expert troubleshooting system 301 in path 1 (e.g., to the first machine learning model used in step 303). Such feedback may also be utilized to create new rules or policies, or modify existing rules or policies, for future recommended troubleshooting actions.

In the FIG. 3A-3D system flow, the first machine learning model provides high-level functions of generating recommended troubleshooting actions (e.g., repair actions, diagnostic actions, etc.). The second machine learning model takes as input information of the given asset being troubleshooted (e.g., asset description such as product platform, symptoms and error descriptions, the recommended troubleshooting action generated by the first machine learning model) and generates an output indicating whether the outcome of the recommended troubleshooting action is desirable or not as per various KPIs. The KPIs may include whether a repair action is likely to result in VFF or NFF, whether a diagnostic action is likely to be effective or ineffective, whether a repair or diagnostic action is complex (e.g., time-consuming, requiring special training or knowledge) or trivial, etc.

Figure 4:
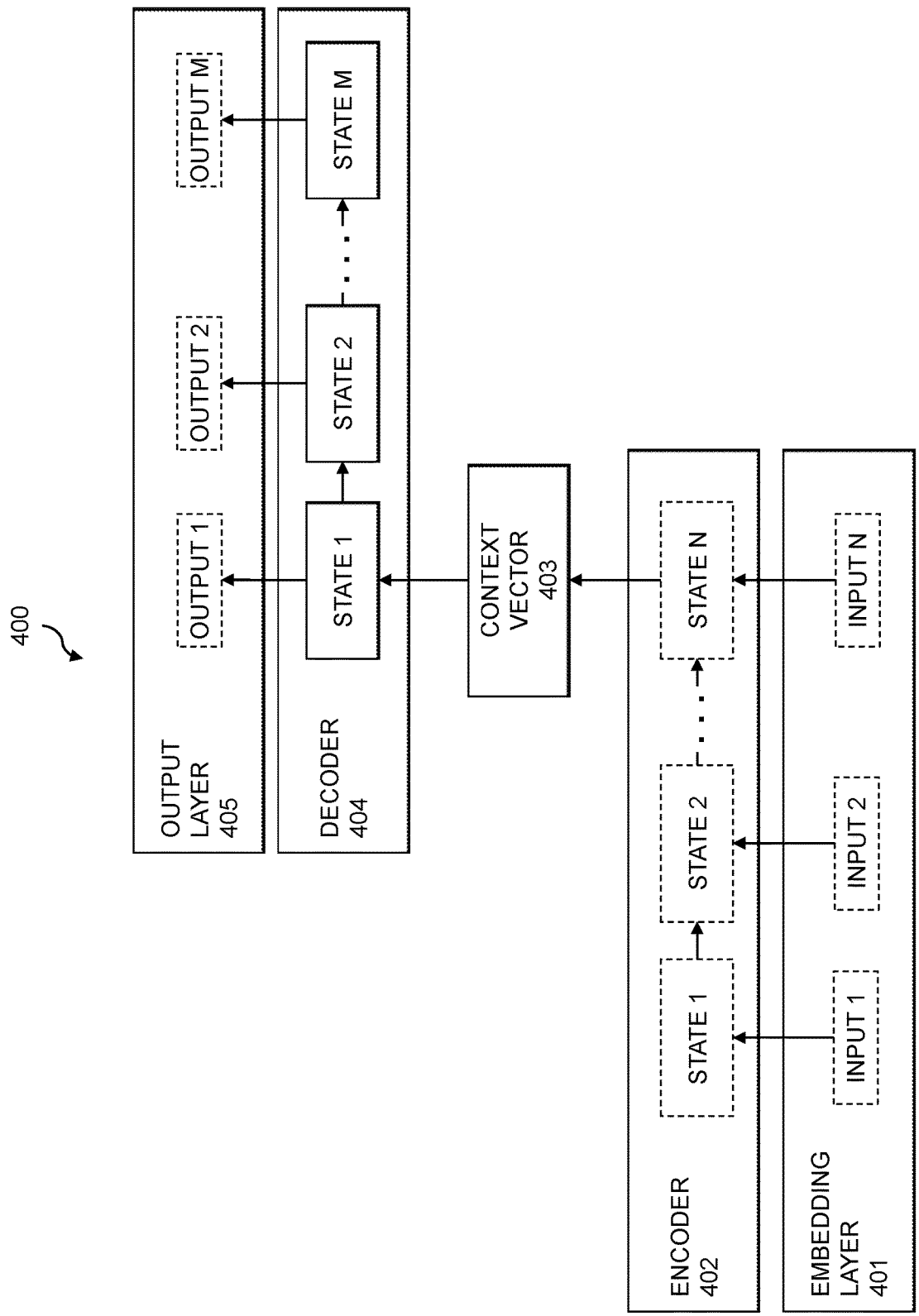
FIG. 4 depicts a sequence-to-sequence machine learning model in an illustrative embodiment.

In some embodiments, both the first and second machine learning models are sequence-to-sequence based deep learning models. FIG. 4 shows an example of a sequence-to-sequence model 400 suitable for use as the first machine learning model to generate recommended troubleshooting actions.

The model 400 can work with both character-level inputs and word-level inputs (e.g., by using word embedding). The model 400 includes an embedding layer 401, an encoder 402, a context or state vector 403, a decoder 404, and an output layer 405. Each of the encoder 402 and decoder 404 may be implemented as a RNN, including a particular type of RNN such as a LSTM RNN, a Gated Recurrent Unit (GRU) RNN, etc. In some embodiments, the hyperparameters used for the RNN include 128 for the size of the hidden layers, 2 as the number of hidden layers, 128 for the embedded size representing the number of dimensions for word embedding, a learning rate of 0.001, a batch size of 32 and an epoch of 100. It should be appreciated, however, that various other hyperparameter values may be used in other embodiments. The choice of particular hyperparameter values for use in implementing the RNNs providing the encoder 402 and decoder 404 may depend on the available computing resources, available time for computation, etc.

Symptom tiers, conditions, product platform and other information are fed into the encoder 402 (e.g., as inputs 1 through N) via the embedding layer 401. For the first machine learning model, the encoder 402 outputs a state (e.g., state N) as the context or state vector 403, which provides the input to decoder 404. The decoder 404 predicts repair actions (e.g., as outputs 1 through M) via output layer 405, which may be implemented as a softmax output layer. Based at least in part on the outcome of each step in the repair process (e.g., 0 or 1 indicating failure or success, respectively), a decision is made as to whether the input "words" provided to the encoder 402 should be modified for the next step or iteration of the sequence-to-sequence model 400.

For new input, the decoder output of the last step (e.g., output M) is added to the last input (e.g., input N). This process is repeated until there is a successful repair, or until the repair process is stopped (e.g., after some designated threshold number of iterations of running the model 400, manual stop by a technician, etc.). The model 400 may be run for each "problem" encountered on a particular asset. If an asset (e.g., a computer system) has two problems, then the model 400 may be run twice, once for each symptom set (e.g., denoting each of the two problems). In case the outcome of the repair or diagnostic action is 1 (e.g., indicating success), then there is no change in the input words provided to the encoder 402 based at least in part on the output vocabulary of the decoder 404. If the outcome is 0 (e.g., indicating failure), then a negation of the output vocabulary of the decoder is appended or augmented to the input provided to the encoder in a next step or iteration. In some embodiments, adding the negation includes adding "not" to each output of the decoder 404. This indicates that the output of the previous step was a failure (e.g., replacing the output "replace commodity motherboard" of the decoder 404 with "replace_not commodity_not motherboard_not").

The sequence-to-sequence model 400 may be trained using character-level or word-level input. For character-level input, the output of the model 400 is character by character. The model 400 may be trained on a dataset including troubleshooting log entries, historical troubleshooting logs suitably transformed into a format fit for a sequence-to-sequence model, external sources (e.g., discussions on technical communities or support forums suitably transformed into a format fit for a sequence-to-sequence model), and for unsuccessful repair and diagnostic tests, a negation (e.g., the word "_not") is added to the troubleshooting actions. For example, if the data says "replacing the motherboard did not help" this may be converted to "replace_not motherboard_not" for use with the model 400.

For word-level input, the output of the model 400 is word by word and in this case "word vectors" or "word embeddings" are created by training on the same information as noted above. Once the model is trained, it may be used by an enterprise system to generate recommended troubleshooting actions (e.g., diagnostic and repair actions).

Figure 5:
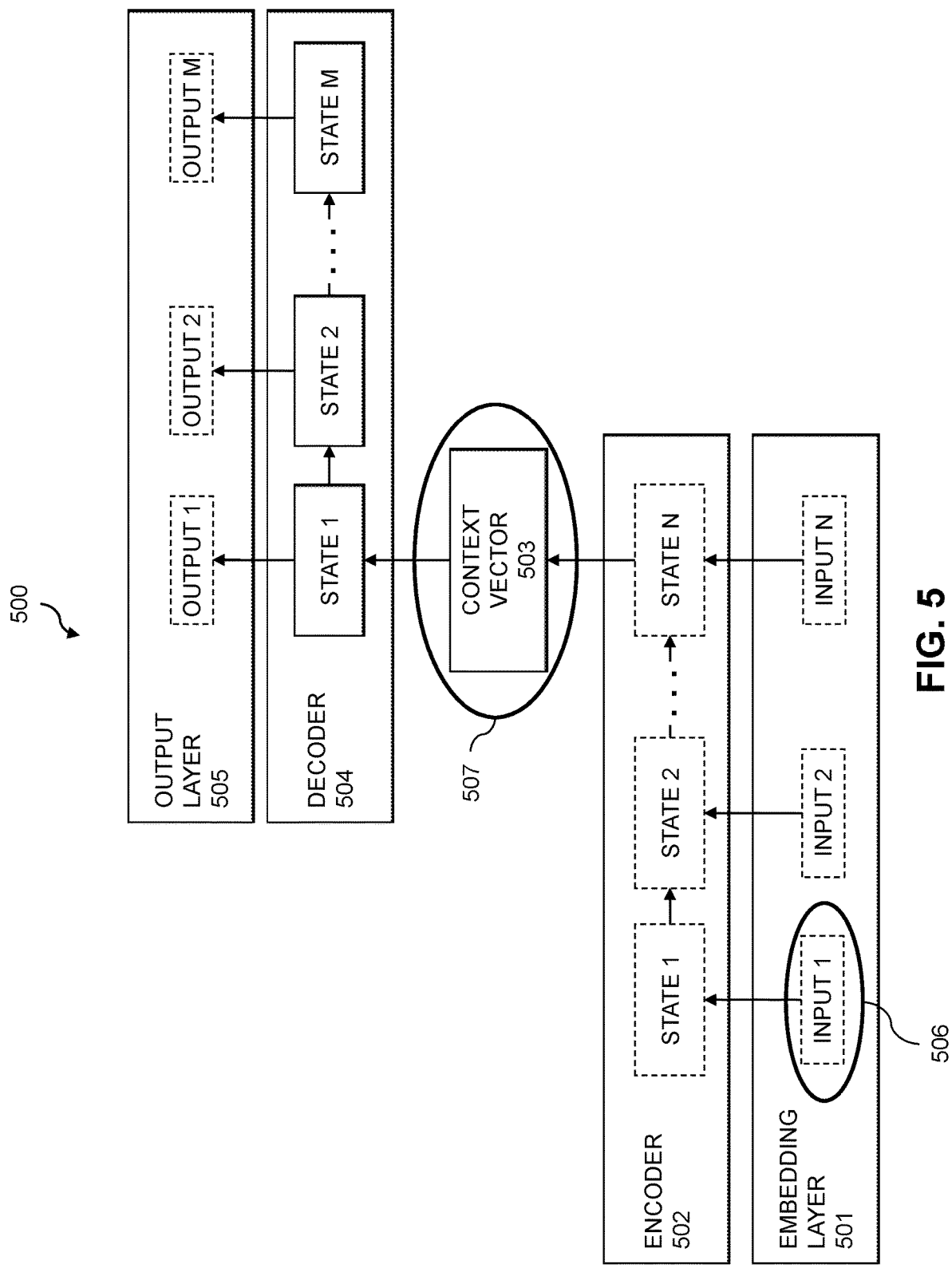
FIG. 5 depicts a sequence-to-sequence machine learning model with attention in an illustrative embodiment.

FIG. 5 shows an example of a sequence-to-sequence model 500 suitable for use as the second machine learning model for pre-screening recommended troubleshooting actions (e.g., generated using the model 400). The model 500 may utilize an architecture similar to that described above in the context of the model 400 (e.g., including an embedding layer 501, encoder 502, context vector 503, decoder 504, and output layer 505). The model 500, however, incorporates an attention mechanism represented by elements 506 and 507. The attention mechanism enables the decoder 504 to focus on important input (e.g., highlighted input 1 506) rather than just the context vector 503. The attention mechanism provides various advantages, particularly as the input for the second machine learning model becomes lengthy (e.g., where there are multiple repair and/or diagnostic actions involved). The attention mechanism helps the second machine learning model to focus on specific parts of the input to predict suitable KPI values.

The sequence-to-sequence model 500, as discussed above, may be composed of an encoder-decoder architecture (e.g., encoder 502 and decoder 504), where the encoder 502 processes the input sequence and encodes, compresses and summarizes the information into a context vector 503 of fixed length. The context vector 503 is expected to be a good summary of the entire input sequence. The decoder 504 is then initialized with the context vector 503, which uses the context vector 503 to generate the transformed output in output layer 505. In practice, however, a disadvantage of the fixed-length context vector 503 design is the incapability of the system to remember longer sequences. Often, the system forgets earlier parts of the sequence once is has processed the entire sequence. Attention is a mechanism that forces the model 500 to focus on specific parts of the input (e.g., 506) when decoding, instead of relying only on the context vector 503.

The encoder 502 of the sequence-to-sequence model 500 processes the input sequence and encodes this information into the context vector 503 (also referred to as a state vector) of a fixed length. This representation is expected to be a good summary of the entire input sequence. The decoder 504 is then initialized with the context vector 503, which is used to start generating the transformed output. A sequence-to-sequence model without attention mechanism will discard all the intermediate states of the encoder 502, and use only its final state (e.g., state N) to initialize the decoder 504 (e.g., states 1, 2, . . . N−1 are discarded).

While such a technique works well for smaller sequences, as the length of the sequence increases a single vector becomes a bottleneck and it gets very difficult to summarize long sequences into a single vector. A critical and apparent disadvantage of the fixed-length context vector design is the incapability of the system to remember longer sequences. Often, the system has forgotten the earlier parts of the sequence once is has processed the entire sequence. This is observed empirically, as the performance of the system decreases drastically as the size of the sequence increases. By incorporating an attention mechanism, the sequence-to-sequence model 500 is able to utilize all of the states 1 through N (e.g., states 1, 2, . . . N−1 are not discarded) in order to construct the context vector 503 required by the decoder 504 to generate the output sequence.

While predicting the output for a long input sequence, the decoder 504 needs to focus on a few important keywords for each output and not the whole sequence. For example, while translating the French-language sequence "Le Chat est noir" to the English-language sequence "The Cat is black"), the decoder 504 while predicting "cat" needs to focus on the initial part of the sequence "Le Chat" and not the entire sequence.

The attention mechanism, in some embodiments, is implemented as follows. For each output (1 through M), the decoder 504 pays "attention" to more important input states. To do so, weights are generated and assigned to denote the contribution of each intermediate state of the input encoder 502. The weights may be assigned using a feedforward neural network. Let the weight be $e_1, e_2, \ldots, e_N$ for the intermediate states of the encoder 502 denoted as $s_1, s_2, \ldots s_N$. The state or context vector 503 is computed as $e_1*s_1+e_2*s_2+e_3*s_3, \ldots +e_N*s_N$. The weights and state vector for each output (1 through M) are calculated as described above. Unlike the fixed state vector used for all the decoder time steps in the case of a sequence-to-sequence model without attention, the sequence-to-sequence model 500 incorporates the attention mechanism and computes a separate state or context vector 503 for each time step by computing the attention weights at every time step.

Figure 6:
FIG. 6 depicts repair logs for assets in an illustrative embodiment.

The operation of the models 400 and 500 will now be described with respect to the troubleshooting entries of table 600 in FIG. 6. In this example, reseating memory is found to be the most optimal repair action for the symptoms of no Power-On Self-Test (POST)/when docked. The table 600 includes entries of logs of symptom sets, diagnostics and repair actions for a product platform "LAT-7480." Each row of the table 600 is assumed to correspond to output of the first machine learning model, which is supplemented with feedback from the second machine learning model. In this example, all rows of the table 600 are for the same product platform (LAT-7480). It should be appreciated, however, that multiple product platforms may be related (e.g., belonging to a same family of products) such that repair and diagnostic actions for one product platform are relevant for other product platforms in the same family.

In each iteration, the second machine learning model takes as input various details and information in a cumulative fashion, including: a product description or product platform, symptoms and error descriptions, and diagnostic and repair actions predicted by the first machine learning model. The second machine learning model output indicates whether the outcome of the diagnostic or repair action recommended by the first machine learning model is desirable or not, as measured using one or more KPIs (e.g., VFF or NFF, effective or ineffective diagnostic, complex or trivial diagnostics or repairs, etc.). In this example, it is assumed that both the first and second machine learning models are sequence-to-sequence type deep learning models (e.g., the models 400 and 500, respectively), but where the second machine learning model differs from the first machine learning model in that it incorporates an attention mechanism.

In a first iteration, the first machine learning model (e.g., model 400) outputs the recommended repair action of "replace commodity memory" and the second machine learning model (e.g., model 500) predicts that the recommended repair action will result in NFF. Accordingly, the repair action of "replace commodity memory" is flagged as undesirable (e.g., likely to result in NFF). It is further assumed in this example that there is no rule or policy available, and thus the system may (but is not required) to display a warning or notification to the technician indicating that the recommended repair action is not likely to be successful. Feedback is then routed to the input of the first machine learning model (e.g., model 400), where the feedback may be "replace commodity memory—NFF."

In a second iteration, the first machine learning model (e.g., model 400), uses feedback from the first iteration, and provides a new recommended repair action of "reseat commodity memory." The second machine learning model (e.g., model 500) predicts that this recommended repair action will result in VFF (e.g., the electrical interconnects are cleaned during the reseat of the memory, solving the symptom set). Accordingly, the repair action of "reseat commodity memory" is flagged as desirable (e.g., likely to result in VFF). The technician will perform the recommended repair action, which is assumed to result in a successful outcome. Feedback is then routed to the input of the first machine learning model (e.g., model 400), where the feedback may be "reseat commodity memory—VFF."

Advantageously, the attention mechanism of the second machine learning model helps to focus on specific parts of the input to predict suitable KPI values for the troubleshooting actions recommended by the first machine learning model. As the input can become lengthy in some cases (e.g., where multiple diagnostic and repairs steps are involved in troubleshooting an asset), the attention mechanism can focus the input. For example, the attention mechanism can enable the second machine learning model to pay attention to certain words in its input to predict that a repair action is likely to result in NFF. Consider the following input to the second machine learning model: "power|no power|no system LED indicator|full functional test system board fail|replace commodity motherboard." The attention mechanism can focus on specific parts of this input, such as "no power" and "full functional test system board fail" to predict that the repair action of "replace commodity motherboard" is likely to result in NFF (e.g., as it is not physically possible to do the diagnostic step of "full functional test" on a "no power" system).

Training of the second machine learning model will now be described with respect to the tables 700 and 710 of FIG. 7. The table 700 shows a set of logs, including a repair identifier, a product description, a symptom set, error descriptions, error conditions, action taken, and results. The symptom set in table 700 is shown as a number (e.g., 1) that represents one or more symptoms encountered by an asset. In other embodiments, the symptom set may be represented as one or more columns each indicating a particular symptom encountered by an asset. The error descriptions include tier 1 and tier 2 error descriptions, where the tier 1 and tier 2 may indicate descriptions and sub-description of errors encountered. In the table 700 for example, the tier 1 error description for each entry is "freeze" with the tier 2 error description "on boot" specifying when the freeze occurs. The error condition provides additional detail regarding the errors encountered (e.g., basic input-output system (BIOS) settings related to boot, physical damage, freezing on loading an operating system (OS) or upon boot, etc.). The action taken field indicates the troubleshooting action or actions taken in attempt to remedy the errors encountered (e.g., updating the BIOS, replacing damaged parts, performing enhanced pre-boot system assessment (ePSA) or other diagnostic tests, etc.). The results, similar to the error descriptions, include tier 1 and tier 2 entries or fields. The tier 1 result field provides a high-level description of the results of the troubleshooting action taken (e.g., BIOS change, the type of part replaced such as mechanical or commodity parts, pass or failure of ePSA, etc.) while the tier 2 result field provides additional detail (e.g., changing BIOS settings, replacing a particular part such as the bottom cover or motherboard, pass or failure of ePSA, etc.).

The table 700 also has corresponding KPIs filled in (e.g., a repair KPI indicating VFF or NFF, and a diagnostic KPI of effective or ineffective). The input of table 700 is converted to training data with labels as shown in table 710. Based on what the last action recommendation is (e.g., a diagnostic action or a repair action), an appropriate KPI label (e.g., the diagnostic KPI or the repair KPI) is passed to the second machine learning model. Although in the FIG. 7 example there is just one KPI each for diagnostic and repair actions, embodiments are not limited to using a single KPI. In other embodiments, multiple KPIs may be used for one or both of diagnostic and repair actions. For example, an additional KPI may be whether the recommended troubleshooting action is complex or trivial (e.g., in terms of skill required to implement, time required to implement, combinations thereof, etc.). This complex/trivial KPI may be used for both diagnostic and repair actions, and may be used in training of the second machine learning model as part of the label in some embodiments. Various other KPIs may be used, including KPIs that are specific to one of diagnostic and repair actions, as well as KPIs that apply to both diagnostic and repair actions.

Figure 8:
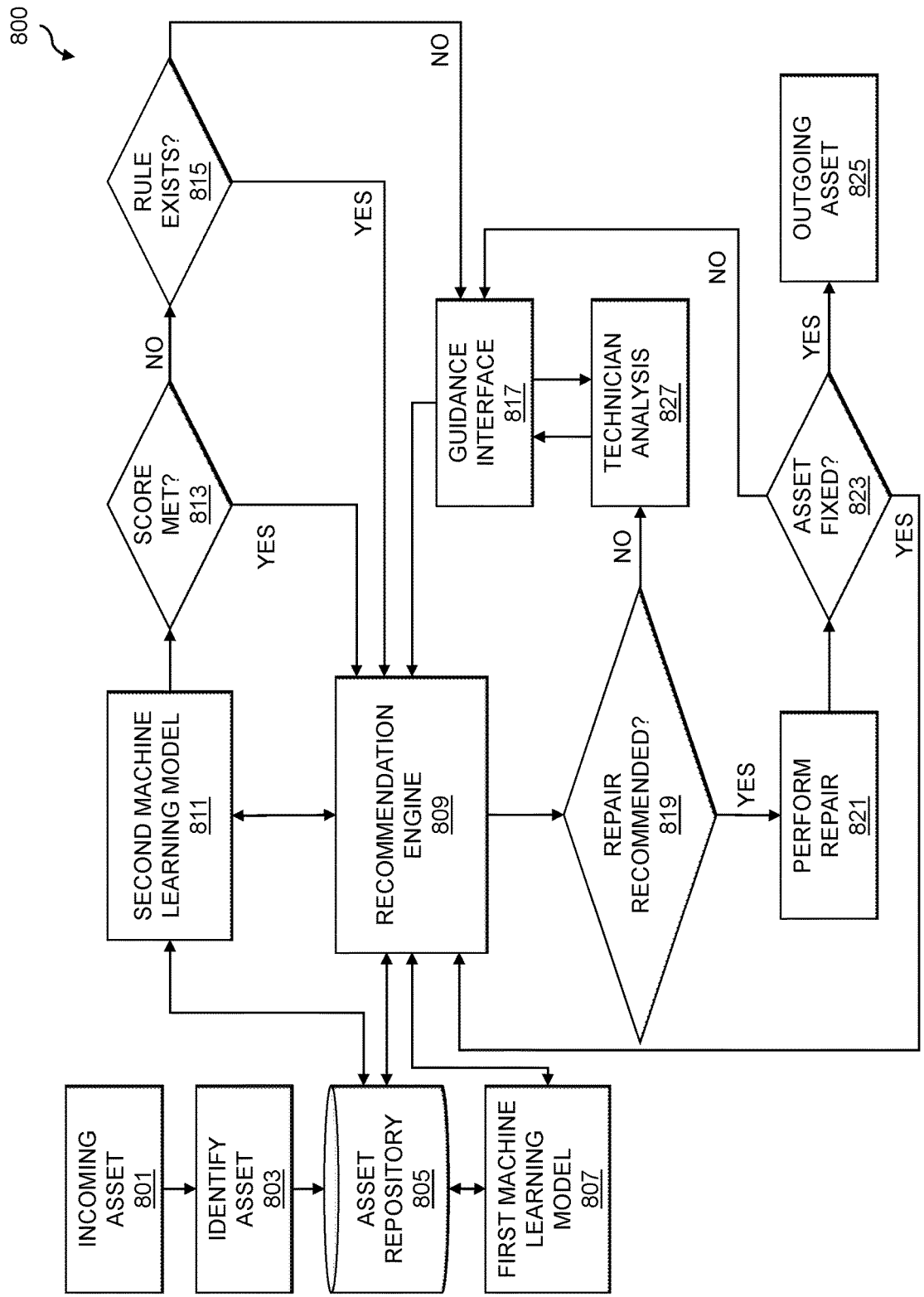
FIG. 8 depicts a processing flow for troubleshooting assets in an illustrative embodiment.

FIG. 8 shows a process flow for handling troubleshooting at a repair depot. In block 801, an incoming asset is received at the repair depot. The incoming asset may include, by way of example, a PC, AIO, desktop, laptop, tablet, etc. In block 803, the incoming asset is identified. This may involve, for example, locating a serial number or other identifier of the asset such as a service tag, and scanning or reading the identifier or service tag to identify the incoming asset. Once identified, an application programming interface (API) call is made to an asset information repository 805 with the identifier or service tag of the incoming asset. The asset information repository 805 may include a database (e.g., a structured query language (SQL) database) with information (e.g., service tag history, symptoms, latest diagnostics, etc.) for the incoming asset and assets similar to the incoming asset (e.g., other models of a computing system with the same or similar hardware and software components). Information from the asset information repository 805 is passed to a first machine learning model 807 for model training. The information from the asset information repository 805 may also be passed to the recommendation engine 809. The recommendation engine 809 uses a trained or deployed instance of the first machine learning model 807, along with information passed from the asset information repository 805, to provide troubleshooting action recommendations for the incoming asset.

These troubleshooting recommendations are provided from the recommendation engine 809 to a second machine learning model 811 for pre-screening. In block 813, a determination is made as to whether the recommended troubleshooting action meets a confidence score (e.g., that the recommended troubleshooting action is likely to be successful). If the result of block 813 is yes, feedback is provided to the recommendation engine 809 to initiate application of the recommended troubleshooting action. If the result of block 813 is no, the flow moves to block 815 where a determination is made as to whether any rule or policy exists to cover the recommended troubleshooting action for the incoming asset.

If the result of block 815 is yes, then appropriate feedback is provided to the recommendation engine 809. This feedback may cause the recommendation engine 809 to re-invoke the first machine learning model 807 to obtain a new recommended troubleshooting action without applying the previous recommended troubleshooting action. This feedback may alternatively cause the recommendation engine 809 to initiate application of the recommended troubleshooting action. The feedback will vary based on the particular rule or policy being applied. For example, a rule or policy may specify that the recommended troubleshooting action will be applied if it is an inexpensive diagnostic action, but that a new recommendation should be received if the recommended troubleshooting action is an expensive repair action (e.g., where expensive and inexpensive may be determined according to various thresholds, such as time, skill or expertise needed to implement, cost of parts, etc.). If the result of block 815 is no, the flow may proceed to displaying a warning or other notification via a guidance interface 817 (e.g., which may provide a graphical user interface) that is invoked by a technician at the repair depot (e.g., to obtain recommended troubleshooting actions, to input or log results of troubleshooting actions that are taken, to receive instructions for performing troubleshooting actions, etc.).

After the decision blocks 813 and 815, and possibly running multiple instance of invoking the first machine learning model 807 to receive a recommended troubleshooting action that is pre-screened by the second machine learning model 811 and which meets the confidence score in block 813 and/or satisfies an applicable rule or policy in block 815, the recommendation engine 809 provides the recommended troubleshooting action to a technician to apply. In block 819, it is determined if the recommended troubleshooting action is a repair action.

If the result of block 819 determination is yes, the repair action is performed in block 821. In block 823, it is determined whether the asset is fixed by the repair action performed in block 821. If the result of the block 823 determination is yes, the troubleshooting is complete and the incoming asset 801 is converted to an outgoing asset 825 that leaves the repair depot (e.g., the asset is returned to the customer or other end-user). Feedback may also be provided to the first machine learning model 807 and second machine learning model 811 via the recommendation engine 809. If the result of the block 823 determination is no, feedback is provided to the guidance interface 817 for technician analysis 827. The guidance interface 817 is used by the technician performing troubleshooting of the asset to log the repair action taken, to report results of the repair action, to provide instruction to the technician on how to perform the repair action, etc. The feedback may also be provided by the guidance interface 817 to the first machine learning model 807 and the second machine learning model 811 via the recommendation engine 809.

If the result of the block 819 determination is no (e.g., the recommended troubleshooting action is a diagnostic action), the diagnostic action is performed on the asset (e.g., automatically such as by running test software on the asset, manually by a technician inspecting parts, etc.). The results of the diagnostic action are then analyzed by the technician in block 827. As discussed above, the technician may utilize the guidance interface 817 to log the diagnostic action taken, report results of the diagnostic action, etc. The guidance interface 817 provides feedback to the first machine learning model 807 and second machine learning model 811 regarding the diagnostic actions via the recommendation engine 809. Such diagnostic action feedback, as well as the repair action feedback discussed above, may also be stored in the asset information repository 805.

The techniques described herein for pre-screening recommended troubleshooting actions utilizing machine learning provide a number of advantages. For example, in the repair context, pre-screening recommended repair actions can reduce the NFF rate for a repair center (e.g., from ~20% to 5% or lower). In some cases, it is difficult to convert NFF results to VFF results via soft calls (e.g., reseating versus replacing parts). The machine learning-based pre-screening techniques described herein can at least partially overcome these difficulties. Various other troubleshooting optimizations may be incorporated in machine learning model training, such as considering the quantity of troubleshooting steps versus the total time to resolution (e.g., cases where more troubleshooting steps are needed due to platform or asset complexity, available symptoms, platform to platform feature sets, etc.).

Additional optimizations may be provided by considering the order and sequence of troubleshooting steps, including identifying critical troubleshooting steps as needed. In addition, erroneous or incomplete troubleshooting steps should be identified to avoid causing errors in machine learning model training. The order and number of troubleshooting steps used to arrive at a successful repair for an encountered symptom set may vary. Over time, for example, the machine learning models may learn patterns of symptom sets and troubleshooting actions that may reduce the total number of steps needed to arrive at a successful repair for a given symptom set. In some embodiments, pre-screening troubleshooting actions may be used to detect fraudulent diagnostic and repair activity.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for utilizing machine learning to predict success of troubleshooting actions for repairing assets will now be described in greater detail with reference to FIGS. 9 and 10. Although described in the context of system 100, these platforms may also be used to implement at least portions of other information processing systems in other embodiments.

Figure 9:
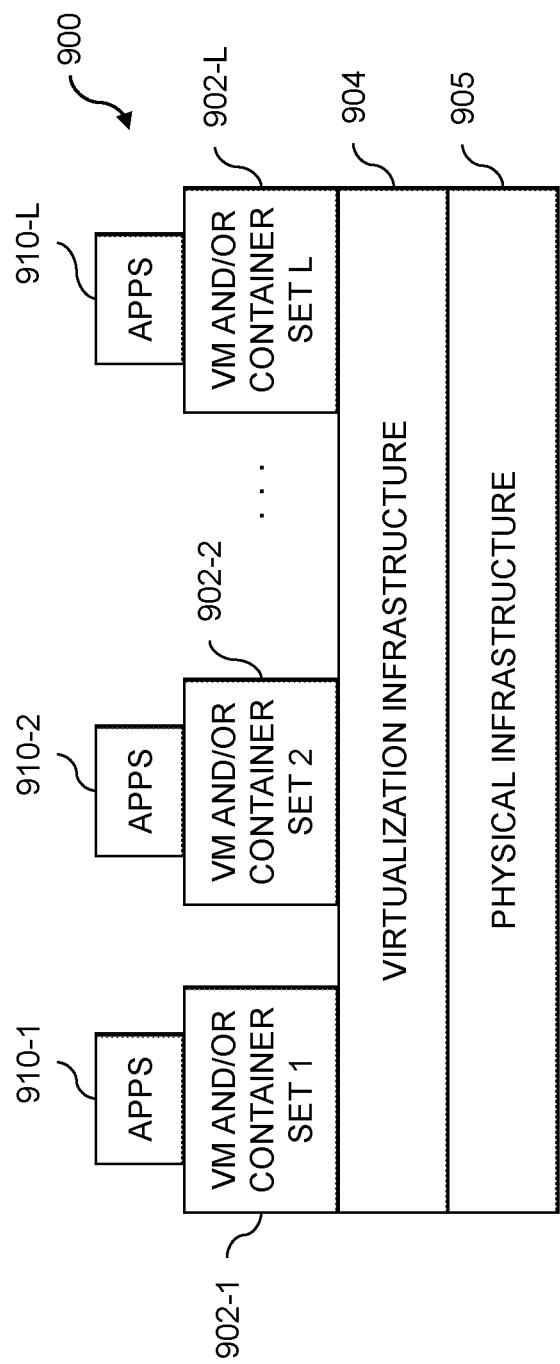
FIGS. 9 and 10 show examples of processing platforms that may be utilized to implement at least a portion of an information processing system in illustrative embodiments.
Figure 10:
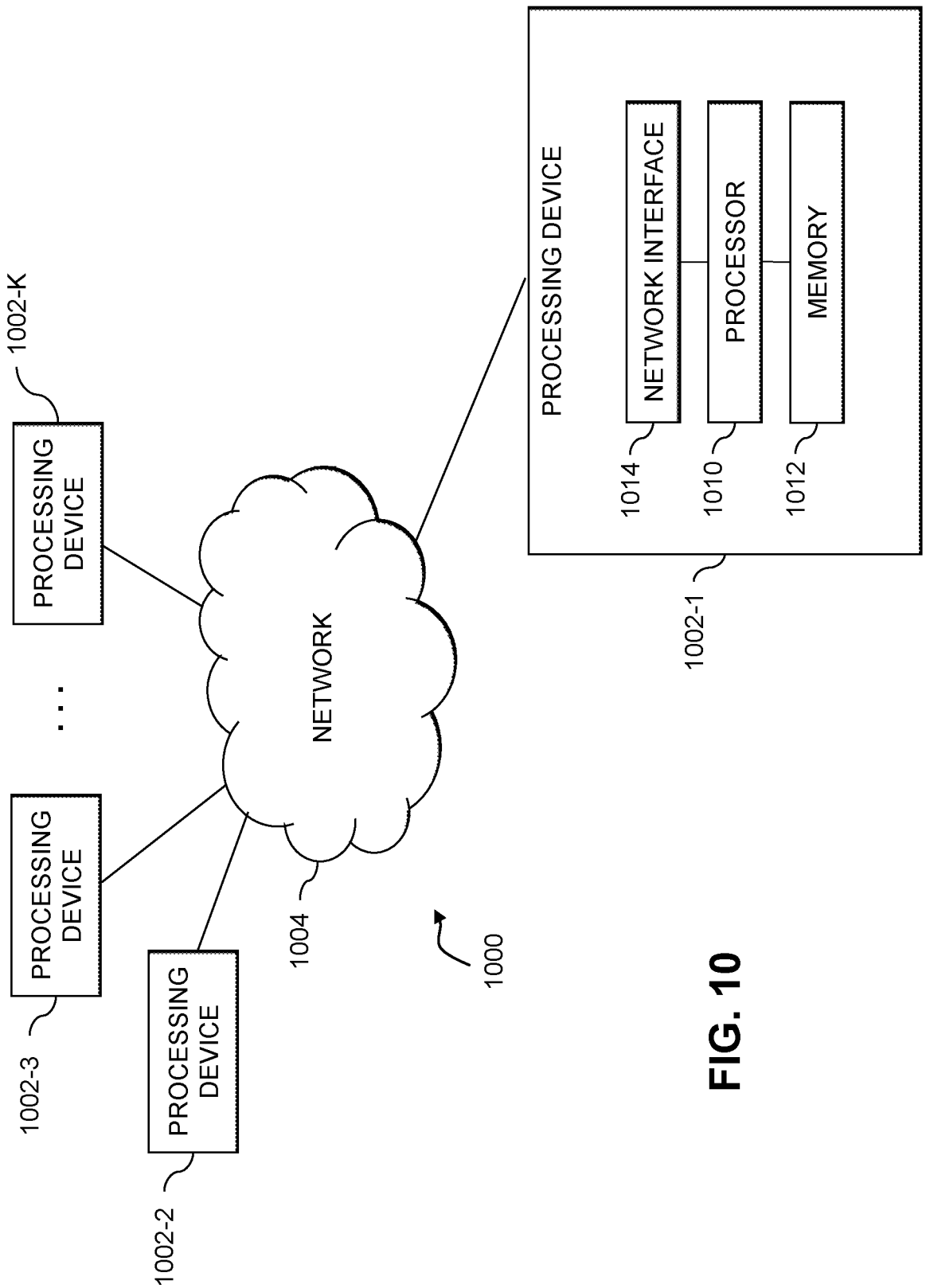

FIG. 9 shows an example processing platform comprising cloud infrastructure 900. The cloud infrastructure 900 comprises a combination of physical and virtual processing resources that may be utilized to implement at least a portion of the information processing system 100 in FIG. 1. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. A hypervisor platform may be used to implement a hypervisor within the virtualization infrastructure 904, where the hypervisor platform has an associated virtual infrastructure management system. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1012 may comprise random access memory (RAM), read-only memory (ROM), flash memory or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for utilizing machine learning to predict success of troubleshooting actions for repairing assets as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, enterprise systems, assets, symptom sets, diagnostic and repair actions, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
   at least one processing device comprising a processor coupled to a memory;
   the at least one processing device being configured to perform steps of:
      obtaining information regarding a given asset to be repaired;
      generating a recommended troubleshooting action to be performed on the given asset;
      providing the recommended troubleshooting action and the obtained information regarding the given asset as input to an encoder of a machine learning model, the machine learning model implementing an attention mechanism;
      receiving, from a decoder of the machine learning model, a predicted success of the recommended troubleshooting action;
      determining whether the predicted success of the recommended troubleshooting action meets one or more designated criteria;
      performing the recommended troubleshooting action responsive to determining that the predicted success of the recommended troubleshooting action meets the one or more designated criteria; and
      responsive to determining that the predicted success of the recommended troubleshooting action does not meet the one or more designated criteria, modifying the recommended troubleshooting action and repeating the providing, receiving and determining steps.

2. The apparatus of claim 1 wherein the information regarding the given asset to be repaired comprises one or more symptom sets, a given one of the one or more symptom sets comprising an identifier of the given asset, a description of the given asset, and a description of at least one error encountered on the given asset.

3. The apparatus of claim 2 wherein the information regarding the given asset to be repaired further comprises result information regarding the success or failure of one or more troubleshooting actions previously performed on the given asset.

4. The apparatus of claim 1 wherein the machine learning model comprises a sequence-to-sequence machine learning model.

5. The apparatus of claim 1 wherein the attention mechanism of the machine learning model is configured to focus the decoder on one or more portions of the input to the encoder.

6. The apparatus of claim 1 wherein generating the recommended troubleshooting action to be performed on the given asset comprises:
   providing the obtained information regarding the given asset as input to an additional encoder of an additional machine learning model; and
   receiving, from an additional decoder of the additional machine learning model, the recommended troubleshooting action.

7. The apparatus of claim 6 wherein modifying the recommended troubleshooting action comprises:
   providing the obtained information regarding the given asset and feedback regarding the recommended troubleshooting action as input to the additional encoder of the additional machine learning model; and
   receiving, from the additional decoder of the additional machine learning model, the modified recommended troubleshooting action.

8. The apparatus of claim 1 wherein determining whether the predicted success of the recommended troubleshooting action meets the one or more designated criteria comprises determining whether the predicted success of the recommended troubleshooting action meets a confidence score for each of one or more key performance indicators.

9. The apparatus of claim 8 wherein the recommended troubleshooting action comprises a diagnostic action, and wherein the one or more key performance indicators comprise at least one of:
   an effectiveness in diagnosing one or more errors encountered by the given asset;
   a complexity of performing the diagnostic action; and
   a cost of performing the diagnostic action.

10. The apparatus of claim 8 wherein the recommended troubleshooting action comprises a repair action, and wherein the one or more key performance indicators comprise at least one of:
    a likelihood of the repair action resulting in a verified fault of one or more components of the given asset;
    a complexity of performing the repair action; and
    a cost of performing the repair action.

11. The apparatus of claim 8 wherein determining whether the predicted success of the recommended troubleshooting action meets the one or more designated criteria further comprises, responsive to determining that the predicted success of the recommended troubleshooting action does not meet the confidence score for each of one or more key performance indicators, determining whether the recommended troubleshooting action is associated with at least one policy from a policy database.

12. The apparatus of claim 11 wherein responsive to determining that the recommended troubleshooting action is not associated with at least one policy from the policy database, providing a notification to a technician responsible for repairing the given asset, the notification indicating the predicted success of the recommended troubleshooting action.

13. The apparatus of claim 11 wherein responsive to determining that the recommended troubleshooting action is associated with at least one policy from the policy database, applying the at least one policy to determine whether to perform the recommended troubleshooting action or modify the recommended troubleshooting action.

14. The apparatus of claim 1 wherein the given asset comprises a computing device, wherein the recommended troubleshooting action comprises a repair action, and wherein the repair action comprises modifying at least one of: one or more software components of the computing device; and one or more hardware components of the computing device.

15. A method comprising steps of:
    obtaining information regarding a given asset to be repaired;
    generating a recommended troubleshooting action to be performed on the given asset;
    providing the recommended troubleshooting action and the obtained information regarding the given asset as input to an encoder of a machine learning model, the machine learning model implementing an attention mechanism;
    receiving, from a decoder of the machine learning model, a predicted success of the recommended troubleshooting action;

determining whether the predicted success of the recommended troubleshooting action meets one or more designated criteria;

performing the recommended troubleshooting action responsive to determining that the predicted success of the recommended troubleshooting action meets the one or more designated criteria; and responsive to determining that the predicted success of the recommended troubleshooting action does not meet the one or more designated criteria, modifying the recommended troubleshooting action and repeating the providing, receiving and determining steps;

wherein the method is performed by at least one processing device comprising a processor coupled to a memory.

16. The method of claim 15 wherein determining whether the predicted success of the recommended troubleshooting action meets the one or more designated criteria comprises determining whether the predicted success of the recommended troubleshooting action meets a confidence score for each of one or more key performance indicators.

17. The method of claim 15 wherein determining whether the predicted success of the recommended troubleshooting action meets the one or more designated criteria further comprises, responsive to determining that the predicted success of the recommended troubleshooting action does not meet the confidence score for each of one or more key performance indicators, determining whether the recommended troubleshooting action is associated with at least one policy from a policy database.

18. A computer program product comprising a non-transitory processor-readable storage medium having stored therein program code of one or more software programs, wherein the program code when executed by at least one processing device causes the at least one processing device to perform steps of:

obtaining information regarding a given asset to be repaired;

generating a recommended troubleshooting action to be performed on the given asset;

providing the recommended troubleshooting action and the obtained information regarding the given asset as input to an encoder of a machine learning model, the machine learning model implementing an attention mechanism;

receiving, from a decoder of the machine learning model, a predicted success of the recommended troubleshooting action;

determining whether the predicted success of the recommended troubleshooting action meets one or more designated criteria;

performing the recommended troubleshooting action responsive to determining that the predicted success of the recommended troubleshooting action meets the one or more designated criteria; and responsive to determining that the predicted success of the recommended troubleshooting action does not meet the one or more designated criteria, modifying the recommended troubleshooting action and repeating the providing, receiving and determining steps.

19. The computer program product of claim 18 wherein determining whether the predicted success of the recommended troubleshooting action meets the one or more designated criteria comprises determining whether the predicted success of the recommended troubleshooting action meets a confidence score for each of one or more key performance indicators.

20. The computer program product of claim 18 determining whether the predicted success of the recommended troubleshooting action meets the one or more designated criteria further comprises, responsive to determining that the predicted success of the recommended troubleshooting action does not meet the confidence score for each of one or more key performance indicators, determining whether the recommended troubleshooting action is associated with at least one policy from a policy database.

\* \* \* \* \*